(12) United States Patent
Terashita

(10) Patent No.: US 9,584,712 B2
(45) Date of Patent: Feb. 28, 2017

(54) IMAGE PROCESSING APPARATUS, INFORMATION PROCESSING APPARATUS, AND IMAGE TRANSFER METHOD

(71) Applicant: Toshiyuki Terashita, Tokyo (JP)

(72) Inventor: Toshiyuki Terashita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 114 days.

(21) Appl. No.: 14/481,233

(22) Filed: Sep. 9, 2014

(65) Prior Publication Data

US 2015/0077577 A1    Mar. 19, 2015

(30) Foreign Application Priority Data

Sep. 17, 2013 (JP) .................. 2013-192411

(51) Int. Cl.
| | |
|---|---|
| *H04N 5/232* | (2006.01) |
| *H04N 1/333* | (2006.01) |
| *H04N 1/00* | (2006.01) |
| *G06F 13/14* | (2006.01) |

(52) U.S. Cl.
CPC ......... *H04N 5/23206* (2013.01); *G06F 13/14* (2013.01); *H04N 1/00347* (2013.01); *H04N 1/3333* (2013.01); *H04N 1/33392* (2013.01); *H04N 2201/0015* (2013.01); *H04N 2201/0041* (2013.01)

(58) Field of Classification Search
CPC ......... H04N 21/43637; H04N 1/00114; H04N 5/9201; H04N 5/23203
USPC .......................................... 348/211.5, 211.14
See application file for complete search history.

(56) References Cited

U.S. PATENT DOCUMENTS

| | | | |
|---|---|---|---|
| 2003/0011703 A1* | 1/2003 | Tanaka ................ | G11B 27/105 348/372 |
| 2004/0051784 A1* | 3/2004 | Ejima ................... | H04N 5/772 348/207.99 |

(Continued)

FOREIGN PATENT DOCUMENTS

| | | | |
|---|---|---|---|
| JP | 2003061035 A | * | 2/2003 |
| JP | 2004246614 A | * | 9/2004 |

(Continued)

OTHER PUBLICATIONS

Machine Translation JP 2010-011423A (2010).*

(Continued)

*Primary Examiner* — Nelson D. Hernández Hernández
(74) *Attorney, Agent, or Firm* — Oblon, McClelland, Maier & Neustadt, L.L.P.

(57) ABSTRACT

According to an aspect of the invention, an image processing apparatus includes: a receiving unit that receives a transfer request, which contains an identifier for identification of an image object, a size of image data obtained by resizing the image object, a transfer starting point of the image data, and a transfer end point of the image data, from an information processing apparatus, a generating unit that generates the image data from the image object based on the transfer request, and a transfer unit that transfers the image data from the transfer starting point to the transfer end point to the information processing apparatus based on the transfer request.

11 Claims, 13 Drawing Sheets

| PARAMETER 4(p) | PARAMETER 5(q) | ACTIONS OF GET RESIZED IMAGE OBJECT |
|---|---|---|
| 0 | 0 | PERFORM STANDARD PTP OPERATION |
| 0 | 1 TO 0xFFFF_FFFE | TRANSFER RESIZED IMAGE: FIRST q BYTES |
| 0 | 0xFFFF_FFFF | TRANSFER RESIZED IMAGE: FROM FIRST TO LAST |
| 1 TO 0xFFFF_FFFF | 0 | SEND TRANSFER COMPLETION NOTIFICATION ABOUT RESIZED IMAGE TO IMAGE PROCESSING APPARATUS |
| 1 TO 0xFFFF_FFFF | 1 TO 0xFFFF_FFFE | RANSFER RESIZED IMAGE: q-TH BYTE FROM p-TH BYTE |
| 1 TO 0xFFFF_FFFF | 0xFFFF_FFFF | TRANSFER RESIZED IMAGE: FROM p-TH BYTE TO LAST |

(56) References Cited

U.S. PATENT DOCUMENTS

| | | | | |
|---|---|---|---|---|
| 2008/0239395 A1* | 10/2008 | Morikawa | .......... | H04N 1/00917 358/1.16 |
| 2008/0316225 A1* | 12/2008 | Sylthe | ................... | G06T 3/4092 345/620 |
| 2009/0153692 A1* | 6/2009 | Koide | ................ | H04N 1/00347 348/222.1 |
| 2011/0159896 A1* | 6/2011 | Nonaka | .................. | G09G 5/346 455/466 |

FOREIGN PATENT DOCUMENTS

| | | | |
|---|---|---|---|
| JP | 2005-020683 | | 1/2005 |
| JP | 2005244631 A | * | 9/2005 |
| JP | 2009111953 A | * | 5/2009 |
| JP | 2009147657 A | * | 7/2009 |
| JP | 2011016343 A | * | 1/2011 |

OTHER PUBLICATIONS

Machine Translation JP 2004-246614 A (2004).*
Machine Translation JP 2005-244631 A (2005).*
Machine Translation JP 2009-111953 A (2009).*
Machine Translation JP 2011-016343 A (2011).*
Machine Translation JP 2003-223467 A (2003).*

* cited by examiner

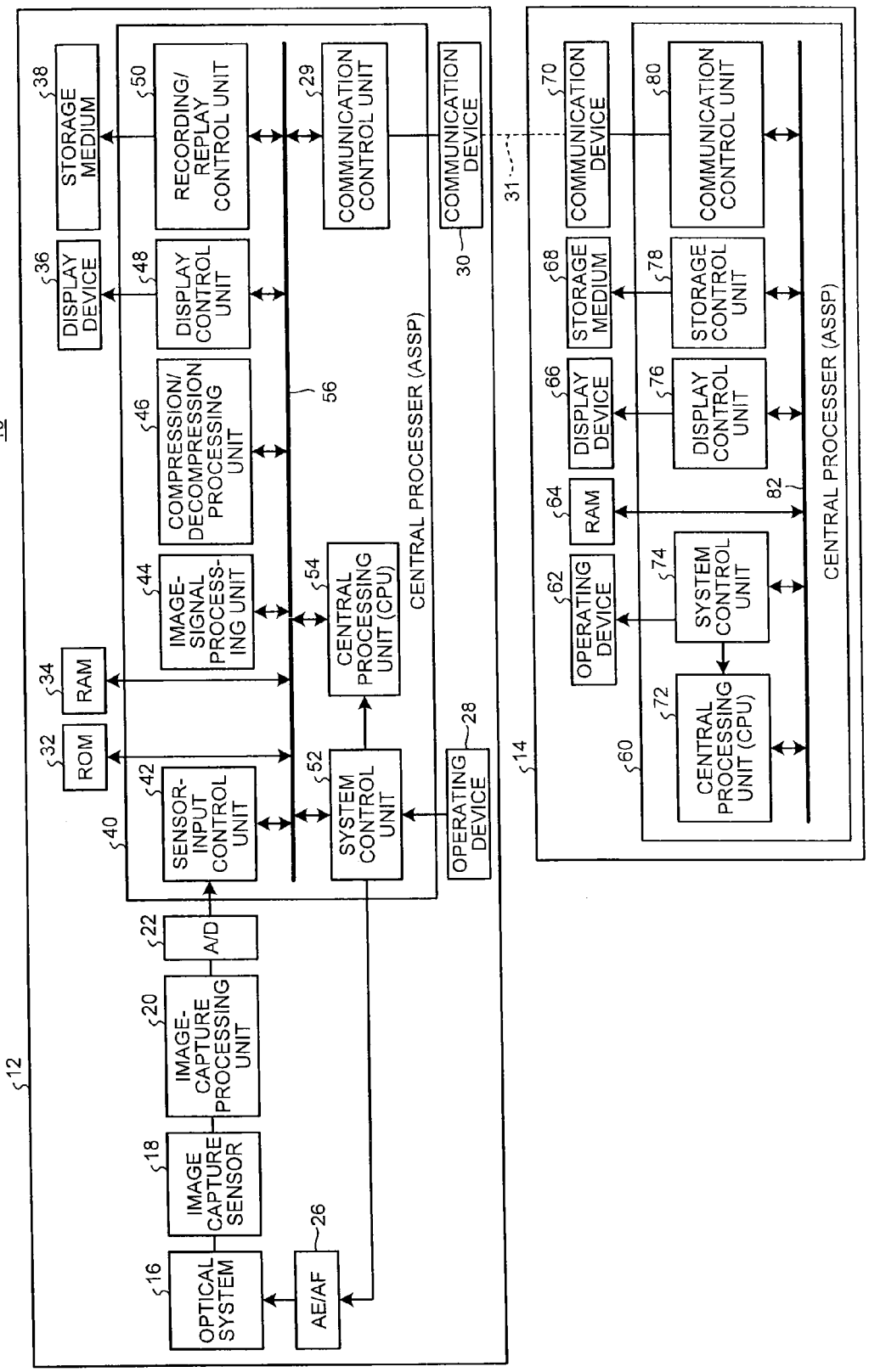

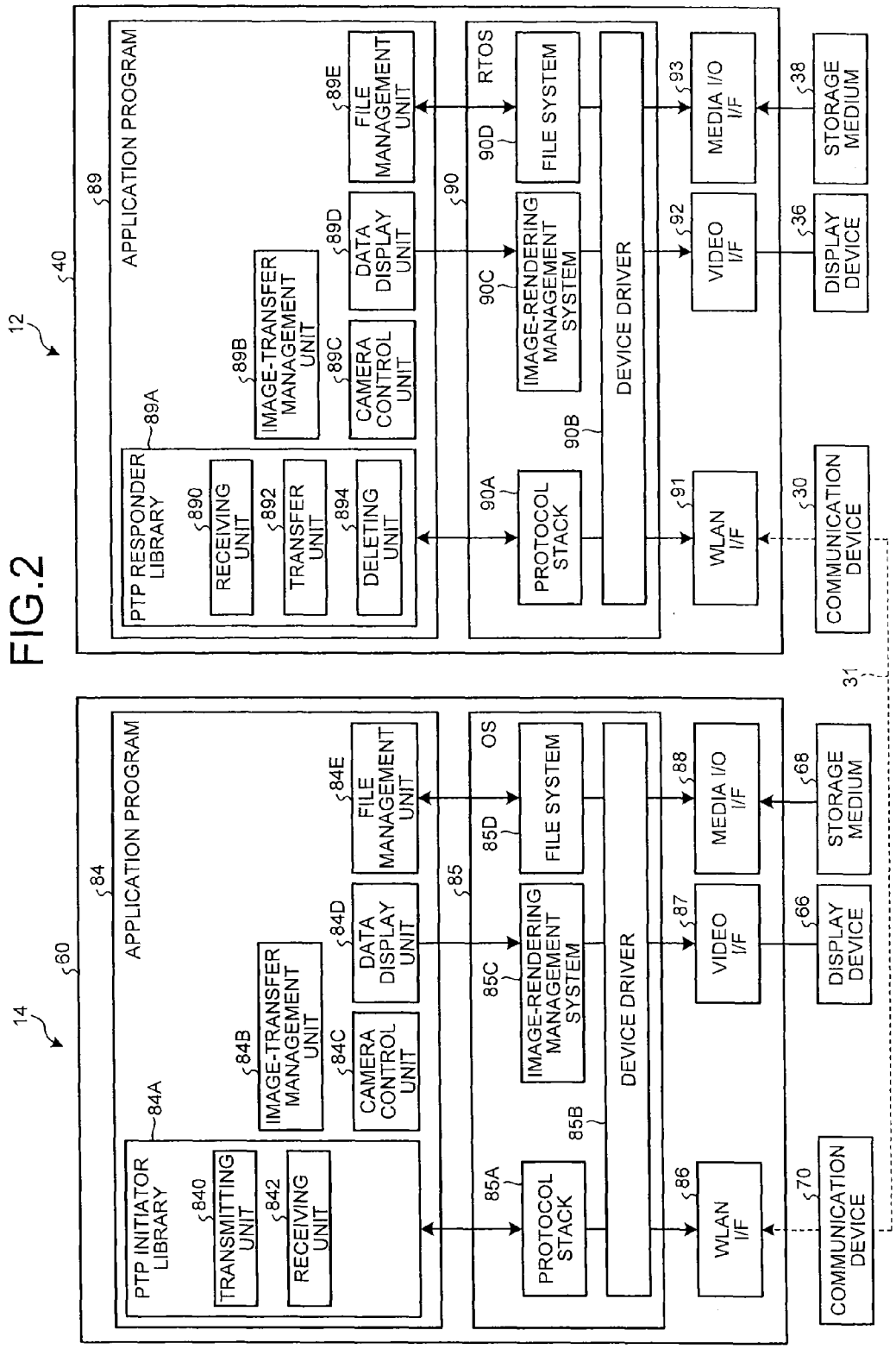

FIG.3

| FIELD | SIZE (BYTES) | DATA TYPE | DESCRIPTION |
| --- | --- | --- | --- |
| OPERATION CODE | 2 | UINT 16 | 0x1022 |
| SESSION ID | 4 | UINT 32 | SESSION ID |
| TRANSACTION ID | 4 | UINT 32 | TRANSACTION ID |
| PARAMETER 1 | 4 | UINT 32 | OBJECT HANDLE |
| PARAMETER 2 | 4 | UINT 32 | IMAGE WIDTH (IN PIXELS) |
| PARAMETER 3 | 4 | UINT 32 | IMAGE HEIGHT (IN PIXELS) |
| PARAMETER 4 | 4 | UNUSED | SHOULD BE SET TO 0x00000000 |
| PARAMETER 5 | 4 | UNUSED | SHOULD BE SET TO 0x00000000 |

FIG.4

| PARAMETER 4(p) | PARAMETER 5(q) | ACTIONS OF GET RESIZED IMAGE OBJECT |
| --- | --- | --- |
| 0 | 0 | PERFORM STANDARD PTP OPERATION |
| 0 | 1 TO 0xFFFF_FFFE | TRANSFER RESIZED IMAGE: FIRST q BYTES |
| 0 | 0xFFFF_FFFF | TRANSFER RESIZED IMAGE: FROM FIRST TO LAST |
| 1 TO 0xFFFF_FFFF | 0 | SEND TRANSFER COMPLETION NOTIFICATION ABOUT RESIZED IMAGE TO IMAGE PROCESSING APPARATUS |
| 1 TO 0xFFFF_FFFF | 1 TO 0xFFFF_FFFE | RANSFER RESIZED IMAGE: q-TH BYTE FROM p-TH BYTE |
| 1 TO 0xFFFF_FFFF | 0xFFFF_FFFF | TRANSFER RESIZED IMAGE: FROM p-TH BYTE TO LAST |

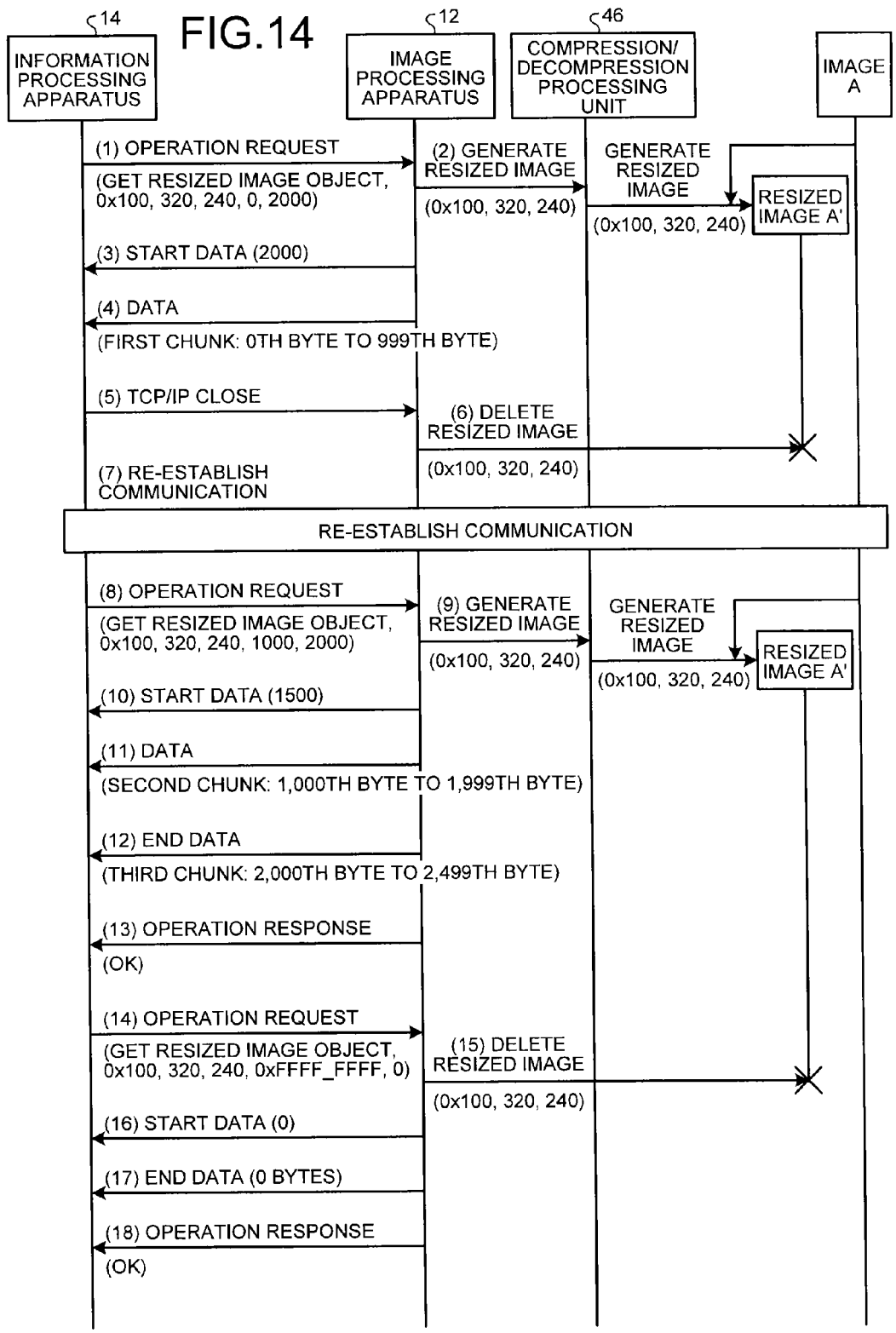

IMAGE PROCESSING APPARATUS, INFORMATION PROCESSING APPARATUS, AND IMAGE TRANSFER METHOD

CROSS-REFERENCE TO RELATED APPLICATIONS

The present application claims priority to and incorporates by reference the entire contents of Japanese Patent Application No. 2013-192411 filed in Japan on Sep. 17, 2013.

BACKGROUND OF THE INVENTION

1. Field of the Invention

The present invention relates generally to an image processing apparatus, an information processing apparatus, an image transfer method, and a computer-readable recording medium.

2. Description of the Related Art

The Picture transfer protocol (PTP) is known as a specification for data transfer between image processing apparatuses such as digital cameras and information processing apparatuses such as smartphones.

GetResizedImageObject, which is one of PTP operations, is used to transfer an image resized to a desired pixel size. However, although GetResizedImageObject allows transferring entire image data resized to a desired pixel size, transferring only a part of the image data is not supported by GetResizedImageObject.

Meanwhile, a technique for acquiring, by designating offset and number of object identifiers, the designated number of object identifiers from the designated offset is disclosed in Japanese Laid-open Patent Application No. 2005-20683, for example.

However, such a conventional technique as that described above relates to acquisition of object identifiers rather than to transfer of image data.

In view of the above circumstance, there is a need to provide an image processing apparatus, an information processing apparatus, an image transfer methods, and a computer-readable recording medium that contains a computer program capable of or allowing transferring only a part of image data resized to a desired size.

It is an object of the present invention to at least partially solve the problem in the conventional technology.

SUMMARY OF THE INVENTION

It is an object of the present invention to at least partially solve the problems in the conventional technology.

According to the present invention, there is provided an image processing apparatus comprising: a receiving unit that receives a transfer request from an information processing apparatus, the transfer request containing an identifier for identification of an image object, a size of image data obtained by resizing the image object, a transfer starting point of the image data, and a transfer end point of the image data; a generating unit that generates the image data from the image object based on the transfer request; and a transfer unit that transfers the image data from the transfer starting point to the transfer end point to the information processing apparatus based on the transfer request.

The present invention also provides an information processing apparatus comprising: a transmitting unit configured to transmit a transfer request to an image processing apparatus, the transfer request containing an identifier for identification of an image object, a size of image data obtained by resizing the image object, a transfer starting point of the image data, and a transfer end point of the image data; and a receiving unit configured to receive the image data from the transfer starting point to the transfer end point from the image processing apparatus based on the transfer request.

The present invention also provides an image transfer method comprising: receiving, from an information processing apparatus, a transfer request containing an identifier for identification of an image object, a size of image data obtained by resizing the image object, a transfer starting point of the image data, and a transfer end point of the image data; generating the image data from the image object based on the transfer request; and transferring the image data from the transfer starting point to the transfer end point to the information processing apparatus based on the transfer request.

The present invention also provides a non-transitory computer-readable recording medium that contains a computer program that causes a computer to function as a receiving unit that receives a transfer request from an information processing apparatus, the transfer request containing an identifier for identification of an image object, a size of image data obtained by resizing the image object, a transfer starting point of the image data, and a transfer end point of the image data; a generating unit that generates the image data from the image object based on the transfer request; and a transfer unit that transfers the image data from the transfer starting point to the transfer end point to the information processing apparatus based on the transfer request.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an example configuration of an image transfer system according to an embodiment of the present invention;

FIG. 2 is a block diagram illustrating a functional configuration of each of ASSPs;

FIG. 3 is a diagram illustrating specification of GetResizedImageObject;

FIG. 4 is a diagram illustrating extension commands of GetResizedImageObject;

FIG. 14 is a sequence diagram of a scenario where communication is closed before receipt of a transfer completion notification about the resized image and transfer of the resized image is resumed at resumption of the communication using the GetResizedImageObject operation according to the embodiment.

DETAILED DESCRIPTION OF THE PREFERRED EMBODIMENTS

Figure 5:
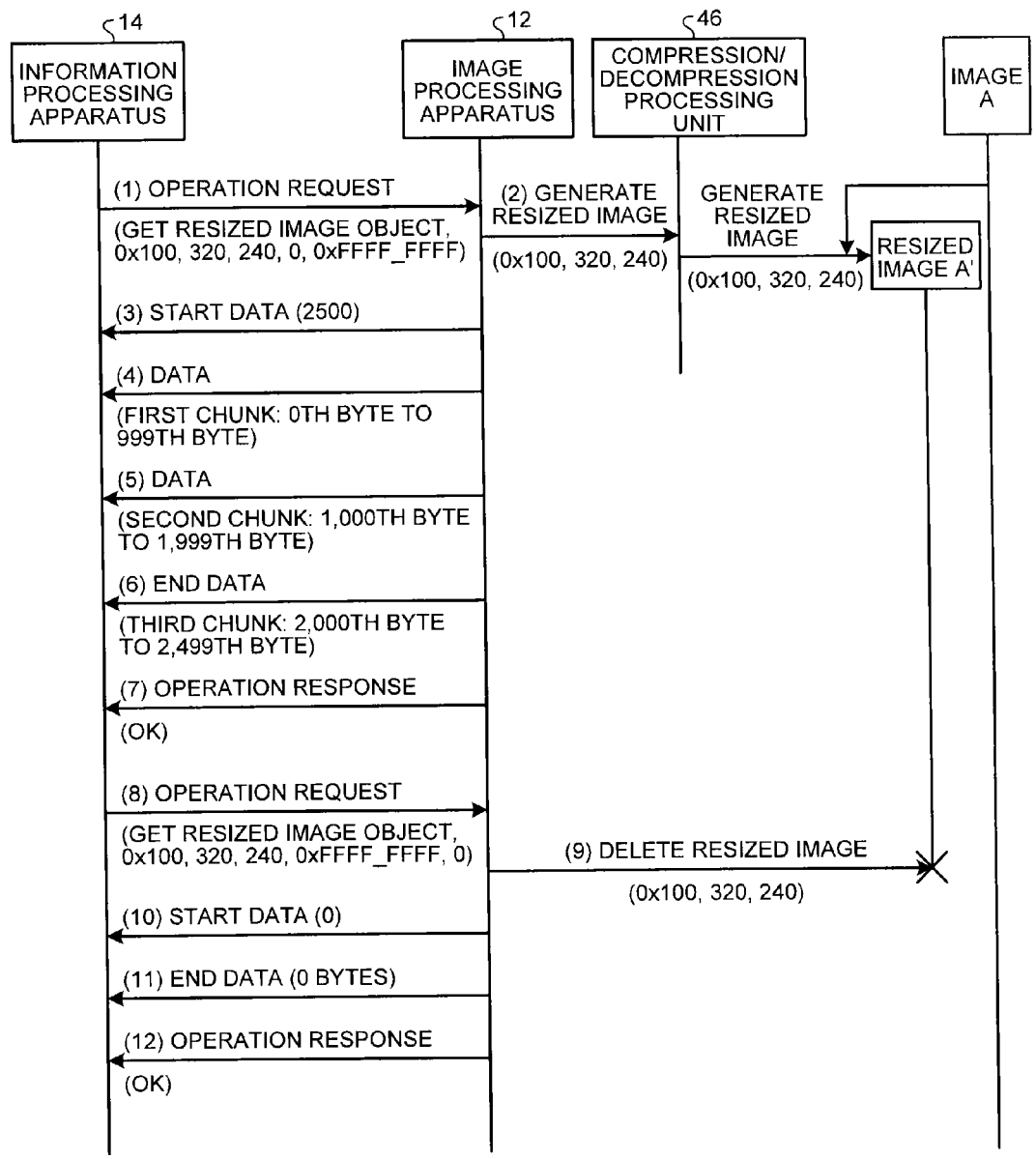
FIG. 5 is a sequence diagram of a scenario where an entire resized image is transferred using a GetResizedImageObject operation according to the embodiment.

Exemplary embodiments of the present invention are described in detail below with reference to the accompanying drawings.

FIG. 1 is a block diagram illustrating an example configuration of an image transfer system 10 according to an embodiment of the present invention. As illustrated in FIG. 1, the image transfer system 10 includes an image processing apparatus 12 and an information processing apparatus 14.

Any apparatus having a function of obtaining an object can be used as the image processing apparatus 12. The image processing apparatus 12 may be, for example, a digital camera or a smartphone. Examples of the object include image data, movie data, and audio data. The information processing apparatus 14 is an apparatus configured to obtain an object stored in the image processing apparatus 12 to which the information processing apparatus 14 is connected. The information processing apparatus 14 may be, for example, a notebook personal computer (PC) or a desktop PC.

The image processing apparatus 12 and the information processing apparatus 14 are connected via a communication interface (I/F) 31. No specific limitation is imposed on a configuration of the communication I/F 31, and any communication I/F, irrespective of wired or wireless, supporting a communication protocol used by the image processing apparatus 12 and the information processing apparatus 14 can be used as the communication I/F 31.

In the embodiment, an example where the image processing apparatus 12 and the information processing apparatus 14 use the picture transfer protocol (PTP) as the communication protocol is described. However, the communication protocol is not limited to PTP. For instance, a communication protocol such as multimedia transfer protocol (MTP) may alternatively be used. In this case, the image processing apparatus 12 and the information processing apparatus 14 handle multimedia data as a single object.

In the embodiment, upon being connected to the information processing apparatus 14, the image processing apparatus 12 exits an image capture mode where the image processing apparatus 12 captures an image of an subject or a replay mode where the image processing apparatus 12 replays an image object to enter a communication mode where the image processing apparatus 12 carries out communication with the information processing apparatus 14. Information processing program, which will be described in detail later, is installed in the information processing apparatus 14.

In the embodiment, it is assumed that a driver (in the embodiment, a PTP-compliant driver) necessary for carrying out communication with the image processing apparatus 12 is incorporated in an operating system (OS) of the information processing apparatus 14 in advance.

As illustrated in FIG. 1, the image processing apparatus 12 includes an optical system 16, an image capture sensor 18, an image-capture processing unit 20, an analog-to-digital converter (A/D) 22, an automatic-exposure/autofocus unit (AE/AF) 26, an operating device 28, a communication device 30, a read only memory (ROM) 32, a random access memory (RAM) 34, a display device 36, a storage medium 38, and a central processor (application-specific standard product (ASSP)) 40.

The optical system 16 condenses light reflected from a subject onto the image capture sensor 18. The image capture sensor 18 receives light representing the subject, performs photoelectric conversion, and stores resultant electrical charges. The image capture sensor 18 may be, for example, a solid-state image sensor, such as a charge coupled device (CCD) sensor or a complementary metal oxide semiconductor (CMOS) sensor. The image-capture processing unit 20 converts the electrical charges stored by the image capture sensor 18 into an analog image signal. The A/D 22 converts the analog image signal into image data, which is a digital image signal. The ASSP 40 stores the converted image data in the storage medium 38 in sequence.

The ROM 32 stores information processing program for use in controlling the image processing apparatus 12 and information related to the image processing apparatus 12 in advance. The RAM 34 has a storage capacity large enough to store multiple image data sets. A general non-volatile storage medium may be used as the storage medium 38 which stores image data. The storage medium 38 may be either detachably or fixedly mounted on a casing of the image processing apparatus 12.

The display device 36 displays information related to the image processing apparatus 12, image data stored in the storage medium 38, information related to the image data, graphical user interface (GUI) such as a configuration menu, and the like. The display device 36 may be, for example, a typical display device such as a liquid crystal display or an organic electroluminescent (EL) display.

The operating device 28 receives a user input of various types and feeds the input to the ASSP 40. The operating device 28 may include a power switch for turning on or off power supply to the image processing apparatus 12, a shutter release button, a menu button for causing the configuration menu to appear on the display device 36, a cross button for moving a cursor displayed on the display device 36, and a SET button for use by a user when configuring or selecting an image, an item, a value, or the like selected with the cursor. The shutter release button can be pressed in either a halfway-pressed state or a fully-pressed state. When the shutter release button is pressed into the halfway-pressed state, the AE/AF 26 drives the optical system 16 to perform autofocusing, automatic exposure, and the like. When the shutter release button is pressed into the fully-pressed state, the image processing apparatus 12 performs digital image capture. The operating device 28 and the display device 36 may be configured in one piece (e.g., as a touch panel).

The communication device 30 is a communication interface for carrying out communication with the information processing apparatus 14 via the communication I/F 31. The communication device 30 may be configured to carry out wired or wireless communication. If the communication device 30 does not have a communication function, the communication device 30 may be configured to update information via a recording medium. The communication device 30 may be mounted on the image processing apparatus 12 either detachably or fixedly.

The ASSP (central processor) 40 functions as a computer providing overall control of the image processing apparatus 12. The ASSP 40 includes a sensor-input control unit 42, an image-signal processing unit 44, a compression/decompression processing unit 46 (an example of "generating unit"), a display control unit 48, a recording/replay control unit 50, a system control unit 52, a central processing unit (CPU) 54, and a communication control unit 29. The sensor-input control unit 42, the image-signal processing unit 44, the compression/decompression processing unit 46, the display control unit 48, the recording/replay control unit 50, the system control unit 52, the CPU 54, and the communication control unit 29 are connected to each other via a bus 56.

The sensor-input control unit 42 receives image data from the A/D 22. The image-signal processing unit 44 performs general image processing, such as white balance adjustment, sharpening, blurring, and/or color balance adjustment, on the received image data. The compression/decompression processing unit 46 has a function of compressing the image data image-processed by the image-signal processing unit 44 by a known image compression method and a function of decompressing the compressed image data. A compression ratio and a decompression ratio are changeable in accordance with a user input entered from the operating device 28.

The display control unit 48 provides control of causing the display device 36 to display an image, such as an image represented by image data stored in the storage medium 38. The recording/replay control unit 50 provides control of storing an object, such as image data, in the storage medium 38, control of replaying an object, such as image data stored in the storage medium 38, and the like. The communication control unit 29 controls the communication device 30.

The CPU 54 controls the respective functional units of the ASSP 40. The system control unit 52 provides overall control of the image processing apparatus 12. More specifically, the system control unit 52 controls the image processing apparatus 12 in accordance with the information processing program stored in the ROM 32. The system control unit 52 generates an image file containing the image data compressed by the compression/decompression processing unit 46 and supplementary information and stores the generated image file in the RAM 34. The supplementary information includes an image-capture condition, image-capture date, and a thumbnail image of the image data. When the image processing apparatus 12 is in a power-saving state, the system control unit 52 reduces battery power consumption by turning off some of the functions of the image processing apparatus 12.

The communication control unit 29 is capable of PTP-based communication. In practice, protocol for use in communication is not limited to PTP but alternatively may be other protocol such as MTP which handles multimedia data as a single object.

The recording/replay control unit 50 has a function of writing image data stored in the RAM 34 to the storage medium 38 and a function of reading out image data stored in the storage medium 38 therefrom and writing the image data to the RAM 34. The image data read out from the storage medium 38 and written to the RAM 34 may be displayed on the display device 36 by the system control unit 52.

The system control unit 52 has a function of placing the image processing apparatus 12 in the power-saving state. A movie file is stored in accordance with, for example, the design rule for camera file system (DCF) specification so that information can be read/written by the recording/replay control unit 50. The movie data is handled as a single multimedia data set made up of two files: a DCF basic file and a DCF thumbnail file.

The information processing apparatus 14 is described below. The information processing apparatus 14 includes an ASSP 60, an operating device 62, a RAM 64, a display device 66, a storage medium 68, and a communication device 70.

The operating device 62 receives a user input of various types. The operating device 62 may be, for example, a keyboard and a mouse. The RAM 64 stores various types of image data. The display device 66 may be a known image device configured to display an image. The storage medium 68 may be a known non-volatile storage medium. In the embodiment, the storage medium 68 stores an OS, various types of application programs, and various types of data.

The communication device 70 transmits and receives various types of data such as image data to and from the image processing apparatus 12 via the communication I/F 31. As described above, the communication device 70 carries out PTP-based communication with the image processing apparatus 12. Hereinafter, PTP-based communication is sometimes referred to as "PTP".

The ASSP 60 controls the information processing apparatus 14. The ASSP 60 includes a CPU 72, a system control unit 74, a display control unit 76, a storage control unit 78, and a communication control unit 80 which are connected to each other via a bus 82.

The CPU 72 controls the ASSP 60. The system control unit 74 controls communication between the information processing apparatus 14 and the image processing apparatus 12. The display control unit 76 controls display of various types of images and the like on the display device 66. The storage control unit 78 controls readout of various types of data from the storage medium 68 and storing various types of data in the storage medium 68. The communication control unit 80 controls communication between the information processing apparatus 14 and the image processing apparatus 12 via the communication device 70.

FIG. 2 is a block diagram illustrating a functional configuration of each of the ASSP 40 of the image processing apparatus 12 and the ASSP 60 of the information processing apparatus 14.

The information processing apparatus 14 carries out communication with the image processing apparatus 12 through an application program (hereinafter, "application") 84 executed on an OS 85 running on hardware of the information processing apparatus 14. The ASSP 60 includes a wireless local area network (WLAN) I/F 86, a video I/F 87, and a media I/O I/F 88.

The WLAN I/F 86 is a communication interface for connecting to the image processing apparatus 12 via the communication device 70. The media I/O I/F 88 is an input/output interface for reading and writing data from and to the storage medium 68. The video I/F 87 is a video interface which converts image data into a video signal displayable by the display device 66.

A general OS may be used as the OS 85. Examples of the OS 85 include mobile operating systems such as iOS (registered trademark) of Apple Computer, Inc. and Android (registered trademark) of Google Inc.

The OS 85 includes a protocol stack 85A, a video-rendering management system 85C, a file system 85D, and a device driver 85B.

The protocol stack 85A is a protocol stack for implementing PTP. The video-rendering management system 85C generates a video signal. The video-rendering management system 85C thus allows the application 84 to generate a video signal without directly controlling hardware. The file system 85D controls input/output of various types of data including image data. The file system 85D thus allows the application 84 to input and output various types of data including image data without directly controlling hardware.

The device driver 85B manages each of the communication device 70, the display device 66, and the storage medium 68 via the WLAN I/F 86, the video I/F 87, the media I/O I/F 88, respectively.

The application 84 includes multiple software modules. In the embodiment, the application 84 includes a PTP initiator library 84A, an image-transfer management unit 84B, a camera control unit 84C, a data display unit 84D, and a file management unit 84E.

The PTP initiator library 84A operates as an initiator which translates PTP communication. The PTP initiator library 84A includes a transmitting unit 840 and a receiving unit 842. The transmitting unit 840 and the receiving unit 842 will be described in detail later.

The image-transfer management unit 84B acquires image data obtained by image capture by the image processing apparatus 12.

The camera control unit 84C transmits a control command to the image processing apparatus 12. For example, the camera control unit 84C transmits a control command to the image processing apparatus 12, thereby specifying an image-capture parameter for electronic flash setting or the like of the image processing apparatus 12 and instructing the image processing apparatus 12 to initiate image capture. The camera control unit 84C remotely controls the image processing apparatus 12 using "InitiateCapture" command provided in PTP.

The data display unit 84D displays various types of information on the display device 66 via the video-rendering management system 85C. The file management unit 84E stores image data, which is transferred from the image processing apparatus 12, in the storage medium 68.

The ASSP 40 of the image processing apparatus 12 carries out communication with the information processing apparatus 14 through an application program (hereinafter, "application") 89 executed on a real-time operating system (RTOS) 90 running on hardware of the image processing apparatus 12. The ASSP 40 of the image processing apparatus 12 includes a WLAN I/F 91, a video I/F 92, and a media I/O I/F 93.

The WLAN I/F 91 is a communication interface for connecting to the information processing apparatus 14 via the communication device 30. The media I/O I/F 93 is an input/output interface for reading and writing data from and to the storage medium 38. The video I/F 92 is a video interface which converts image data into a video signal displayable by the display device 36.

A general OS may be used as the RTOS 90. Examples of the RTOS 90 include real-time kernels to be embedded such as TOPPERS, which is one of operating systems compliant with micro industrial TRON (µITRON), and a software component group.

The RTOS 90 includes a protocol stack 90A, a video-rendering management system 90C, a file system 90D, and a device driver 90B.

The protocol stack 90A is a protocol stack for implementing PTP. The video-rendering management system 90C generates a video signal. The video-rendering management system 90C thus allows the application 89 to generate a video signal without directly controlling hardware. The file system 90D controls input/output of various types of data including image data. The file system 90D thus allows the application 89 to input and output various types of data including image data without directly controlling hardware.

The device driver 90B manages each of the communication device 30, the display device 36, and the storage medium 38 via the WLAN I/F 91, the video I/F 92, the media I/O I/F 93, respectively.

The application 89 includes multiple software modules. In the embodiment, the application 89 includes a PTP responder library 89A, an image-transfer management unit 89B, a camera control unit 89C, a data display unit 89D, and a file management unit 89E.

The PTP responder library 89A operates as a responder which translates PTP communication. The PTP responder library 89A includes a receiving unit 890, a transfer unit 892, and a deleting unit 894. The receiving unit 890, the transfer unit 892, and the deleting unit 894 will be described in detail later.

The camera control unit 89C transmits a control command to the information processing apparatus 14. The data display unit 89D causes the display device 36 to display various types of information via the video-rendering management system 90C. The file management unit 89E stores various types of data including image data in the storage medium 38.

GetResizedImageObject, which is a PTP operation for use in transferring image data resized to a desired pixel size (hereinafter "resized image") between the image processing apparatus 12 and the information processing apparatus 14, is described below.

Specification of GetResizedImageObject is described in ISO 15740:2008 Clause 10.5.34 as illustrated in FIG. 3. Referring to FIG. 3, in GetResizedImageObject, Parameter1 indicates an object handle; Parameter2 indicates an image width; Parameter3 indicates an image height; Parameter4 and Parameter5 are unused.

Accordingly, in the embodiment, transferring a part of image data using GetResizedImageObject without adding a vender extension command is implemented by extending the unused Parameter4 and Parameter5. More specifically, actions illustrated in FIG. 4 are added to GetResizedImageObject by combining values of Parameter4 and Parameter5.

The transmitting unit 840 of the PTP initiator library 84A causes the communication control unit 29 to transmit to the image processing apparatus 12 a transfer request (GetResizedImageObject) including: an identifier for identification of an image object (object handle), a size of image data obtained by resizing the image object (width and height of a resized image), a transfer starting point of the image data (p-th byte of the resized image), and a transfer end point of the image data (q-th byte of the resized image).

The receiving unit 890 of the PTP responder library 89A causes the communication control unit 80 to receive the transfer request (GetResizedImageObject) from the information processing apparatus 14.

The compression/decompression processing unit 46 generates image data (resized image) from the image object based on the transfer request (GetResizedImageObject). The image object is stored in the file system 90D, for example. The compression/decompression processing unit 46 may skip generation of the image data (resized image having the width and the height) of the size specified by the transfer request (GetResizedImageObject) in a case where the image data has already been generated.

The transfer unit 892 of the PTP responder library 89A causes the communication control unit 80 to transmit the image data (resized image) generated by the compression/decompression processing unit 46, from the transfer starting point (the p-th byte of the resized image) to the transfer end point (the q-th byte of the resized image), to the information processing apparatus 14 based on the transfer request (GetResizedImageObject).

The receiving unit 842 of the PTP initiator library 84A causes the communication control unit 29 to receive the image data (resized image), from the transfer starting point (the p-th byte of the resized image) to the transfer end point (the q-th byte of the resized image), from the image processing apparatus 12 based on the transfer request (GetResizedImageObject) transmitted from the transmitting unit 840.

Upon completion of the transfer of the image data (resized image), the transmitting unit 840 causes the communication control unit 29 to transmit a transfer completion notification (GetResizedImageObject) including the size of the image data (the width and the height of the resized image) and transfer completion information indicating that the transfer of the image data is completed to the image processing apparatus 12. The transfer completion information can be specified by setting the value of Parameter4 of GetResizedImageObject to any one of 1 to 0xFFFF_FFFF and the value of Parameter5 to 0.

The receiving unit 890 causes the communication control unit 80 to receive the transfer completion notification (GetResizedImageObject) from the information processing apparatus 14.

The deleting unit 894 of the PTP responder library 89A deletes the image data based on the transfer completion notification (GetResizedImageObject).

The transmitting unit 840 causes the communication control unit 29 to transmit a deletion request (DeleteObject) containing the identifier (object handle) to the image processing apparatus 12.

The receiving unit 890 causes the communication control unit 80 to receive the deletion request (DeleteObject) from the information processing apparatus 14.

The deleting unit 894 deletes the image data (resized image) and the image object based on the deletion request (DeleteObject).

The transmitting unit 840 causes the communication control unit 29 to transmit a predetermined request to the image processing apparatus 12. Examples of the predetermined request include a request for FormatStore which formats the file system 90D of the image processing apparatus 12, a request for ResetDevice which resets the image processing apparatus 12, a request for PowerDown which causes the image processing apparatus 12 to power down, a request for SelfTest which causes the image processing apparatus 12 to initiate a device-dependent self-test, a request for CloseSession which closes a PTP session, and a request for closing TCP/IP communication.

The receiving unit 890 causes the communication control unit 80 to receive the predetermined request from the information processing apparatus 14.

The deleting unit 894 deletes the image data (resized image) based on the predetermined request.

To cancel the transfer of the image data (resized image), the transmitting unit 840 causes the communication control unit 29 to transmit a cancel request (Cancel) requesting to cancel the transfer request to the image processing apparatus 12.

The receiving unit 890 causes the communication control unit 80 to receive the cancel request (Cancel) from the information processing apparatus 14.

The transfer unit 892 causes the communication control unit 80 to cancel the transfer of the image data (resized image) based on the cancel request (Cancel).

It should be noted that the deleting unit 894 does not delete the image data (resized image) even when the cancel request (Cancel) is received.

Image data transfer processing performed between the image processing apparatus 12 and the information processing apparatus 14 is specifically described below. Hereinafter, an example case where a resized image A' which is 320 pixels in width and 240 pixels in height and obtained by resizing an image A, to which an object handle 0x100 is assigned, is transferred from the image processing apparatus 12 to the information processing apparatus 14 is described. The resized image A' is 2,500 bytes in size. The image processing apparatus 12 transmits the resized image A' in chunks, each chunk is up to 1,000 bytes, using Data Packet and End Data Packet. Session ID and Transaction ID are omitted.

FIG. 5 is a sequence diagram of a scenario where an entire resized image is transferred using a GetResizedImageObject operation according to the embodiment.

At Step (1), the transmitting unit 840 issues a request for GetResizedImageObject to the image processing apparatus 12 using Operation Request Packet. In this request, the value of Parameter4 is set to 0, and the value of Parameter5 is set to 0xFFFF_FFFF.

At Step (2), the compression/decompression processing unit 46 generates the resized image A' from the image A and temporarily stores the resized image A' in a memory, the file system 90D, or the like.

At Step (3), the transfer unit 892 transmits a notification that data of 2,500 bytes is to be transmitted to the information processing apparatus 14 using Start Data Packet.

At Step (4), the transfer unit 892 transmits first chunk (1,000 bytes: the 0th byte to the 999th byte) of the resized image A' to the information processing apparatus 14 using Data Packet.

At Step (5), the transfer unit 892 transmits second chunk (1,000 bytes: the 1,000th byte to the 1,999th byte) of the resized image A' to the information processing apparatus 14 using Data Packet.

At Step (6), the transfer unit 892 transmits third chunk (500 bytes: the 2,000th byte to the 2,499th byte) of the resized image A' to the information processing apparatus 14 using End Data Packet.

At Step (7), the transfer unit 892 transmits a notice of operation completion to the information processing apparatus 14 using Operation Response Packet.

At Step (8), the transmitting unit 840 issues a request for GetResizedImageObject to the image processing apparatus 12 using Operation Request Packet. In this request, the value of Parameter4 is set to 0xFFFF_FFFF, and the value of Parameter5 is set to 0.

At Step (9), the deleting unit 894 deletes the temporarily-stored resized image A'.

At Step (10), the transfer unit 892 transmits a notification that data of 0 bytes is to be transmitted to the information processing apparatus 14 using Start Data Packet.

At Step (11), the transfer unit 892 transmits a chunk of 0 bytes to the information processing apparatus 14 using End Data Packet.

At Step (12), the transfer unit 892 transmits a notice of operation completion to the information processing apparatus 14 using Operation Response Packet.

Figure 6:
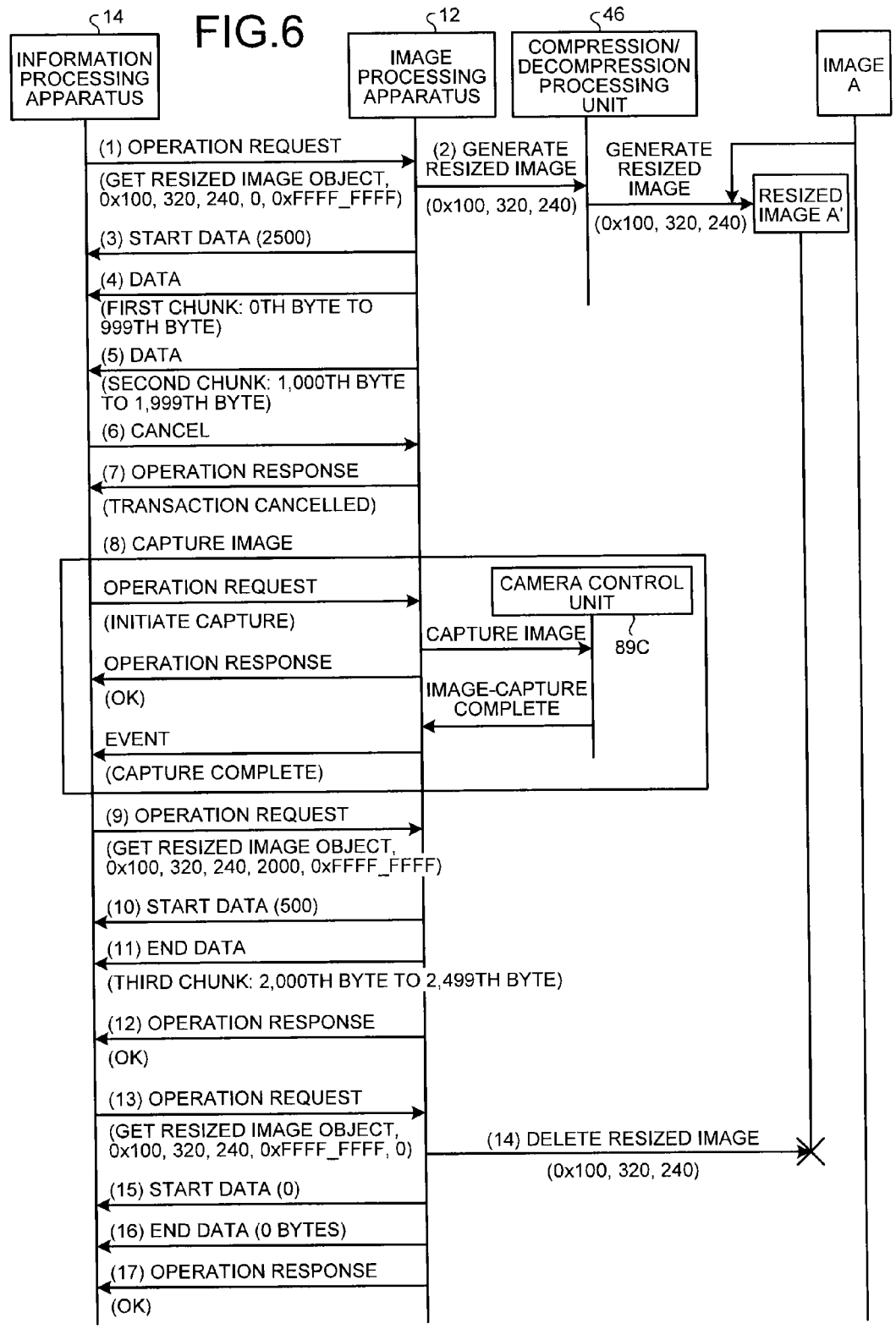
FIG. 6 is a sequence diagram of a scenario where transfer of the resized image is suspended and thereafter the transfer of the resized image is resumed using the GetResizedImageObject operation according to the embodiment.

FIG. 6 is a sequence diagram of a scenario where transfer of a resized image is suspended and thereafter the transfer of the resized image is resumed using the GetResizedImageObject operation according to the embodiment.

Steps (1) to (5) are similar to those of FIG. 5.

At Step (6), the transmitting unit 840 transmits Cancel Packet to the image processing apparatus 12 to instruct the image processing apparatus 12 to cancel the transfer of the resized image.

At Step (7), the transfer unit 892 transmits a notice of operation cancellation to the information processing apparatus 14 using Operation Response Packet. It should be noted that the deleting unit 894 does not delete the temporarily-stored resized image A'; this is because the extension function of Step (1) of GetResizedImageObject is valid.

At Step (8), the information processing apparatus 14 requests the image processing apparatus 12 to initiate, as an interruption, image capture. The image processing apparatus 12 performs image capture. The transfer unit 892 transmits a notice of image-capture completion to the information processing apparatus 14 using Capture Complete Event.

At Step (9), the transmitting unit 840 issues a request for GetResizedImageObject to the image processing apparatus 12 using Operation Request Packet to resume the transfer of the resized image A'. In this request, the value of Parameter4 is set to 2,000, and the value of Parameter5 is set to 0xFFFF_FFFF.

At Step (10), the transfer unit 892 transmits a notification that data of 500 bytes is to be transmitted to the information processing apparatus 14 using Start Data Packet.

Steps (11) to (17) are similar to Steps (6) to (12) of FIG. 5.

The extended GetResizedImageObject operation of the embodiment allows requesting transfer with designation of a transfer starting point of the resized image A' in this manner. Accordingly, transfer of the resized image A' can be resumed without re-receiving already-received data.

Furthermore, according to the extended GetResizedImageObject operation of the embodiment, the resized image A' is not deleted even when the transfer is suspended as described above. Accordingly, the resized image A' is reusable at resumption of the transfer.

Figure 7:
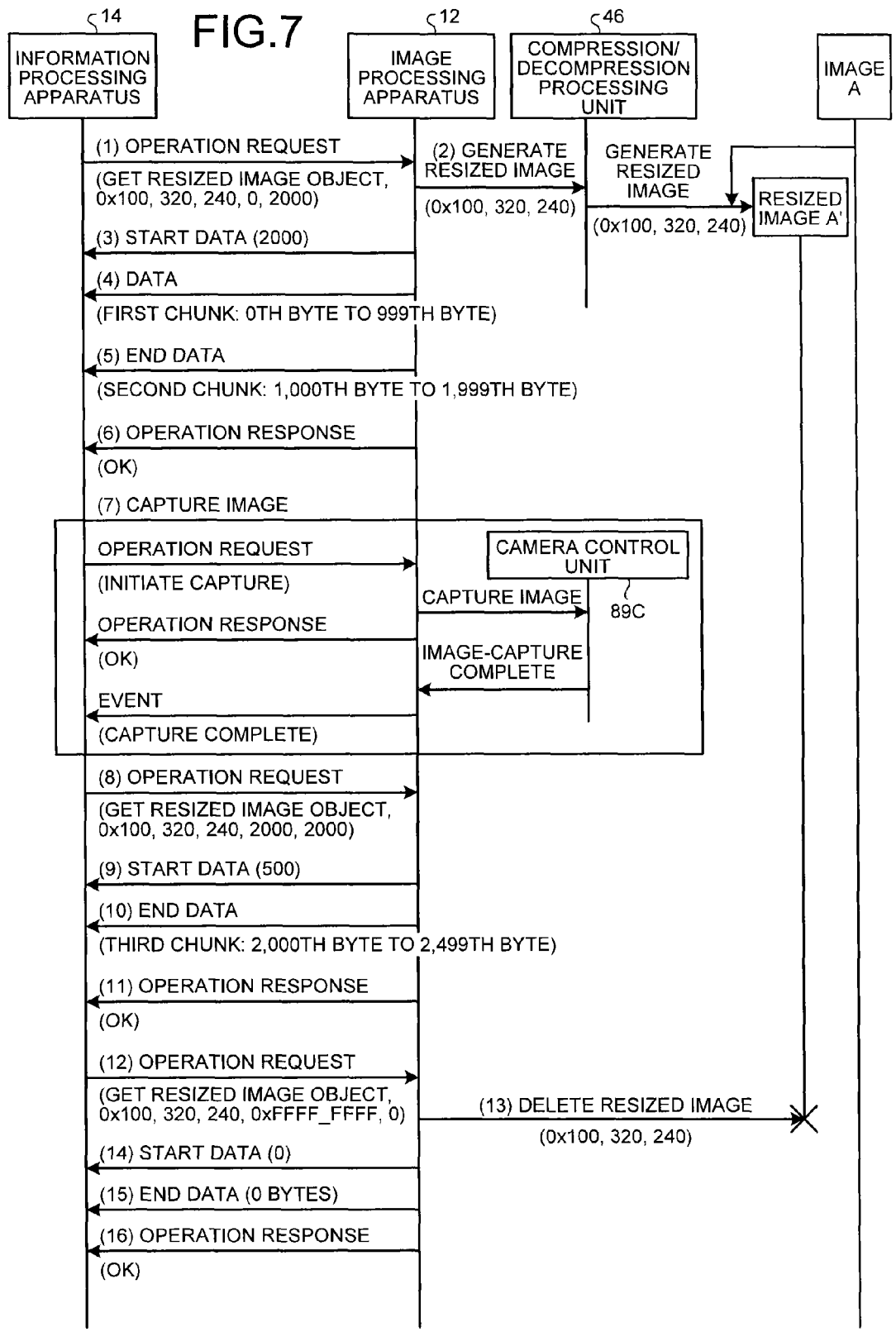
FIG. 7 is a sequence diagram of a scenario where the resized image is transferred in units of fixed bytes using the GetResizedImageObject operation according to the embodiment.

FIG. 7 is a sequence diagram of a scenario where a resized image is transferred in units of fixed bytes using the GetResizedImageObject operation according to the embodiment. In FIG. 7, it is assumed that data is transferred in units of 2,000 bytes using the GetResizedImageObject operation.

At Step (1), the transmitting unit 840 issues a request for GetResizedImageObject to the image processing apparatus 12 using Operation Request Packet. In this request, the value of Parameter4 is set to 0, and the value of Parameter5 is set to 2,000.

At Step (2), the compression/decompression processing unit 46 generates the resized image A' from the image A and temporarily stores the resized image A' in the file system 90D or the like.

At Step (3), the transfer unit 892 transmits a notification that data of 2,000 bytes is to be transmitted to the information processing apparatus 14 using Start Data Packet.

At Step (4), the transfer unit 892 transmits the first chunk (1,000 bytes: the 0th byte to the 999th byte) of the resized image A' to the information processing apparatus 14 using Data Packet.

At Step (5), the transfer unit 892 transmits the second chunk (1,000 bytes: the 1,000th byte to the 1,999th byte) of the resized image A' to the information processing apparatus 14 using End Data Packet.

At Step (6), the transfer unit 892 transmits operation completion to the information processing apparatus 14 using Operation Response Packet.

At Step (7), the information processing apparatus 14 requests the image processing apparatus 12 to initiate image capture. The image processing apparatus 12 performs image capture. The transfer unit 892 transmits a notice of image-capture completion to the information processing apparatus 14 using Capture Complete Event.

At Step (8), the transmitting unit 840 issues a request for GetResizedImageObject to the image processing apparatus 12 using Operation Request Packet. In this request, the value of Parameter4 is set to 2,000, and the value of Parameter5 is set to 2,500.

At Step (9), the transfer unit 892 transmits a notification that data of 500 bytes is to be transmitted to the information processing apparatus 14 using Start Data Packet.

Steps (10) to (16) are similar to Steps (6) to (12) of FIG. 5.

The extended GetResizedImageObject operation of the embodiment allows the resized image A' to be transferred in units of fixed bytes as described above. Accordingly, other operation, such as image capture, than the transfer can be performed during when the transfer is suspended.

Figure 8:
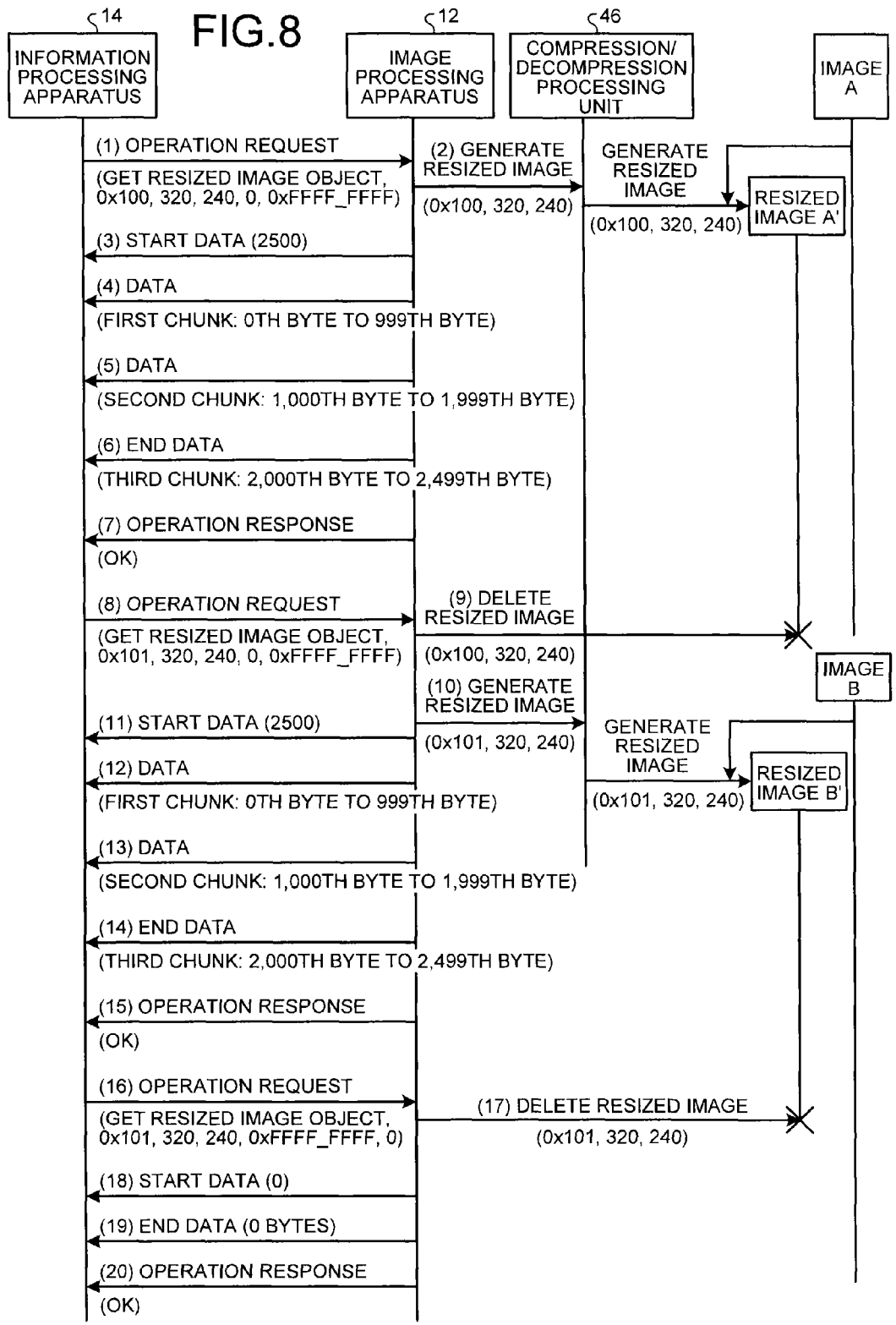
FIG. 8 is a sequence diagram of a scenario where transfer of a second resized image is started before receipt of a transfer completion notification about the first resized image using the GetResizedImageObject operation according to the embodiment.

FIG. 8 is a sequence diagram of a scenario where transfer of a second resized image is started before receipt of a transfer completion notification about a first resized image using the GetResizedImageObject operation according to the embodiment. Referring to FIG. 8, an example case where the image processing apparatus 12 permits only a single resized image to be temporarily stored is described below. More specifically, in this example case, transfer of a resized image B' which is 320 pixels in width and 240 pixels in height obtained by resizing an image B, to which an object handle 0x101 is assigned, is started before receipt of a transfer completion notification about the resized image A'. It is assumed that the resized image B' is 2,500 bytes in size.

Steps (1) to (7) are similar to those of FIG. 5.

At Step (8), the transmitting unit 840 issues a request for GetResizedImageObject to the image processing apparatus 12 using Operation Request Packet. In this request, the value of Parameter1 is set to 0x101, the value of Parameter4 is set to 0, and the value of Parameter5 is set to 0xFFFF_FFFF.

At Step (9), the deleting unit 894 deletes the temporarily-stored resized image A'.

At Step (10), the compression/decompression processing unit 46 generates the resized image B' from the image B and temporarily stores the resized image B' in the file system 90D or the like.

At Step (11), the transfer unit 892 transmits a notification that data of 2,500 bytes is to be transmitted to the information processing apparatus 14 using Start Data Packet.

At Step (12), the transfer unit 892 transmits a first chunk (1,000 bytes: the 0th byte to the 999th byte) of the resized image B' to the information processing apparatus 14 using Data Packet.

At Step (13), the transfer unit 892 transmits a second chunk (1,000 bytes: the 1,000th byte to the 1,999th byte) of the resized image B' to the information processing apparatus 14 using Data Packet.

At Step (14), the transfer unit 892 transmits a third chunk (500 bytes: the 2,000th byte to the 2,499th byte) of the resized image B' to the information processing apparatus 14 using End Data Packet.

At Step (15), the transfer unit 892 transmits a notice of operation completion to the information processing apparatus 14 using Operation Response Packet.

At Step (16), the transmitting unit 840 issues a request for GetResizedImageObject to the image processing apparatus 12 using Operation Request Packet. In this request, the value of Parameter1 is set to 0x101, the value of Parameter4 is set to 0xFFFF_FFFF, and the value of Parameter5 is set to 0.

At Step (17), the deleting unit 894 deletes the temporarily-stored resized image B'.

At Step (18), the transfer unit 892 transmits a notification that data of 0 bytes is to be transmitted to the information processing apparatus 14 using Start Data Packet.

At Step (19), the transfer unit 892 transmits a chunk of 0 bytes to the information processing apparatus 14 using End Data Packet.

At Step (20), the transfer unit 892 transmits a notice of operation completion to the information processing apparatus 14 using Operation Response Packet.

According to the extended GetResizedImageObject operation of the embodiment, a temporarily-stored resized image is deleted upon receiving another request for GetResizedImageObject in this manner so that the number of temporarily-stored image(s) or the number of total bytes thereof is limited up to a predetermined value. Accordingly, the image processing apparatus 12 can increase free space in the file system 90D or a memory without receiving a transfer completion notification.

Figure 9:
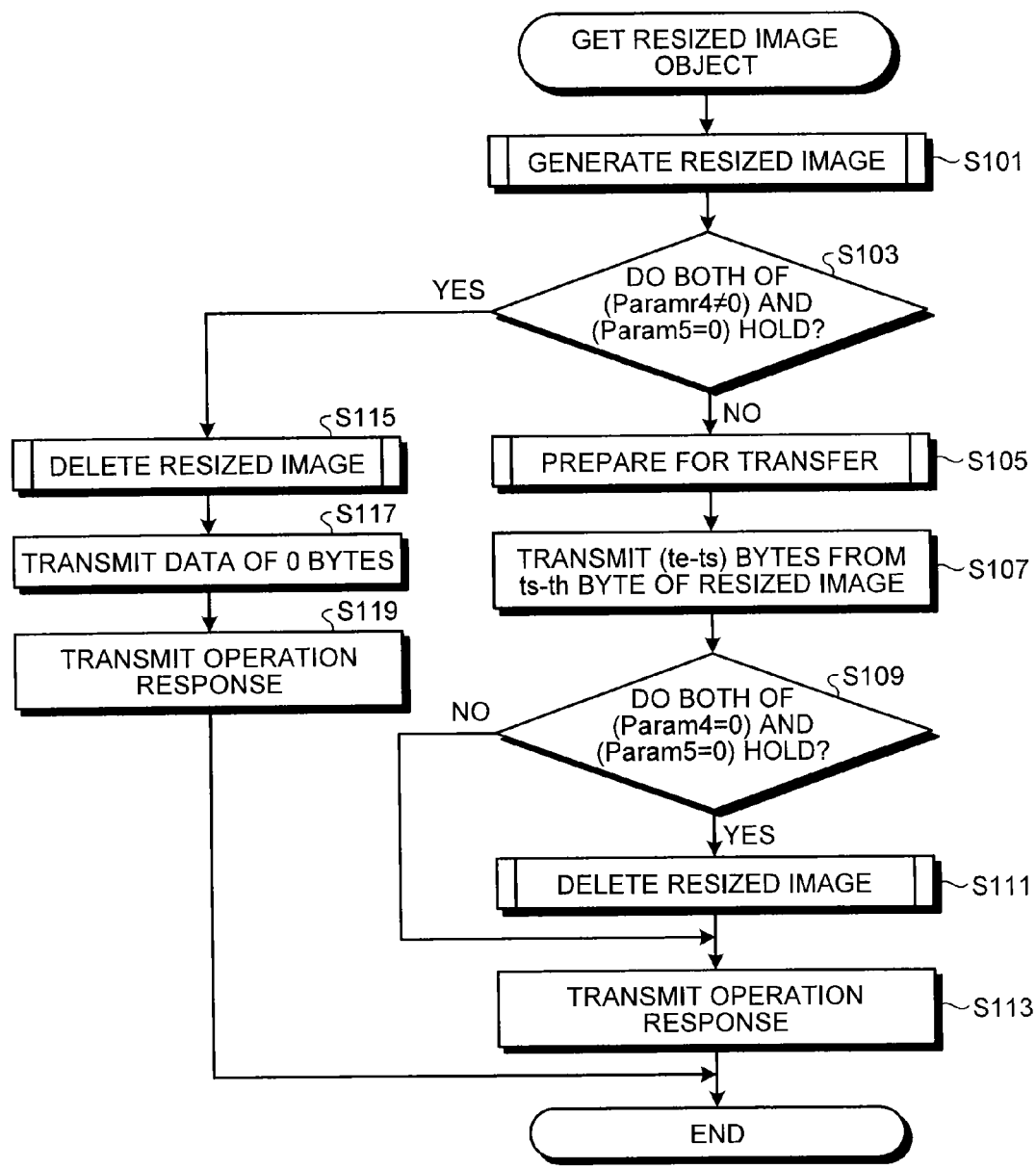
FIG. 9 is a flowchart illustrating processing performed by an image processing apparatus in the GetResizedImageObject operation according to the embodiment.

FIG. 9 is a flowchart illustrating processing performed by the image processing apparatus 12 in the GetResizedImageObject operation according to the embodiment.

First, the compression/decompression processing unit 46 generates a resized image from an image object based on GetResizedImageObject (Step S101).

If, in GetResizedImageObject, any one of (Parameter4≠0) and (Parameter5=0) does not hold (No at Step S103), the transfer unit 892 prepares for transfer of the resized image (i.e., determines a transfer starting point ts and a transfer end point te) (Step S105), and transmits (te-ts) bytes from the ts-th byte of the resized image data to the information processing apparatus 14 (Step S107).

If, in GetResizedImageObject, both of (Parameter4=0) and (Parameter5=0) hold (Yes at Step S109), the deleting unit 894 deletes the resized image (Step S111). Note that if, in GetResizedImageObject, any one of (Parameter4=0) and (Parameter5=0) does not hold (No at Step S109), the deleting unit 894 does not delete the resized image.

Subsequently, the transfer unit 892 transmits operation completion (Operation Response) to the information processing apparatus 14 (Step S113).

On the other hand, if, in GetResizedImageObject, both of (Parameter4≠0) and (Parameter5=0) hold (Yes at Step S115), the deleting unit 894 deletes the resized image (Step S115); the transfer unit 892 transmits data of 0 bytes to the information processing apparatus 14 (Step S117) and transmits a notice of operation completion (Operation Response) to the information processing apparatus 14 (Step S119).

Figure 10:
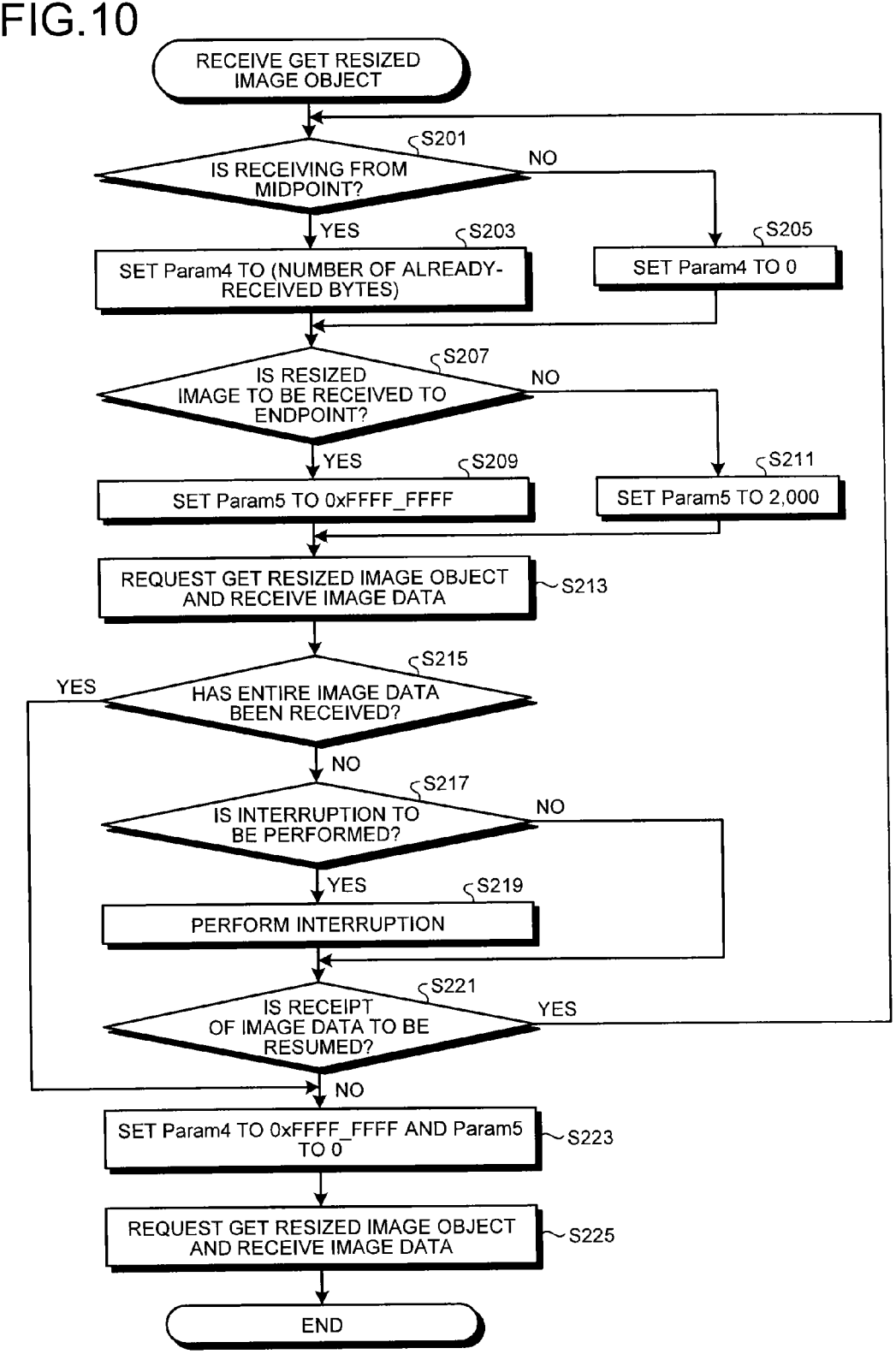
FIG. 10 is a flowchart illustrating processing performed by an information processing apparatus in the GetResizedImageObject operation according to the embodiment.

FIG. 10 is a flowchart illustrating processing performed by the information processing apparatus 14 in the GetResizedImageObject operation according to the embodiment.

When receiving a resized image from a midpoint of the resized image (Yes at Step S201), Parameter4 of GetResizedImageObject is set to the number of already-received bytes (Step S203). When receiving a resized image from a start point of the resized image (No at Step S201), Parameter4 of GetResizedImageObject is set to 0 (Step S205).

When the resized image is to be received to an end of the resized image (Yes at Step S207), Parameter5 of GetResizedImageObject is set to 0xFFFF_FFFF (Step S209). When receiving a resized image to a midpoint of the resized image (No at Step S207), Parameter5 of GetResizedImageObject is set to 2,000, for example (Step S211).

Subsequently, the transmitting unit 840 transmits GetResizedImageObject to the image processing apparatus 12. The receiving unit 842 receives image data (Step S213).

When an interruption is to be performed during receipt of the image data (No at Step S215 and Yes at Step S217), the PTP initiator library 84A performs the interruption (Step S219). When the receipt of image data is to be resumed (Yes at Step S221), processing goes back to Step S201.

On the other hand, when the receipt of the image data is completed (Yes at Step S215) or when the receipt of image data is to be resumed (No at Step S221), the transmitting unit 840 sets Parameter4 of GetResizedImageObject to 0xFFFF_FFFF and Parameter5 to 0 (Step S223) and transmits GetResizedImageObject to the image processing apparatus 12 (Step S225).

Figure 11:
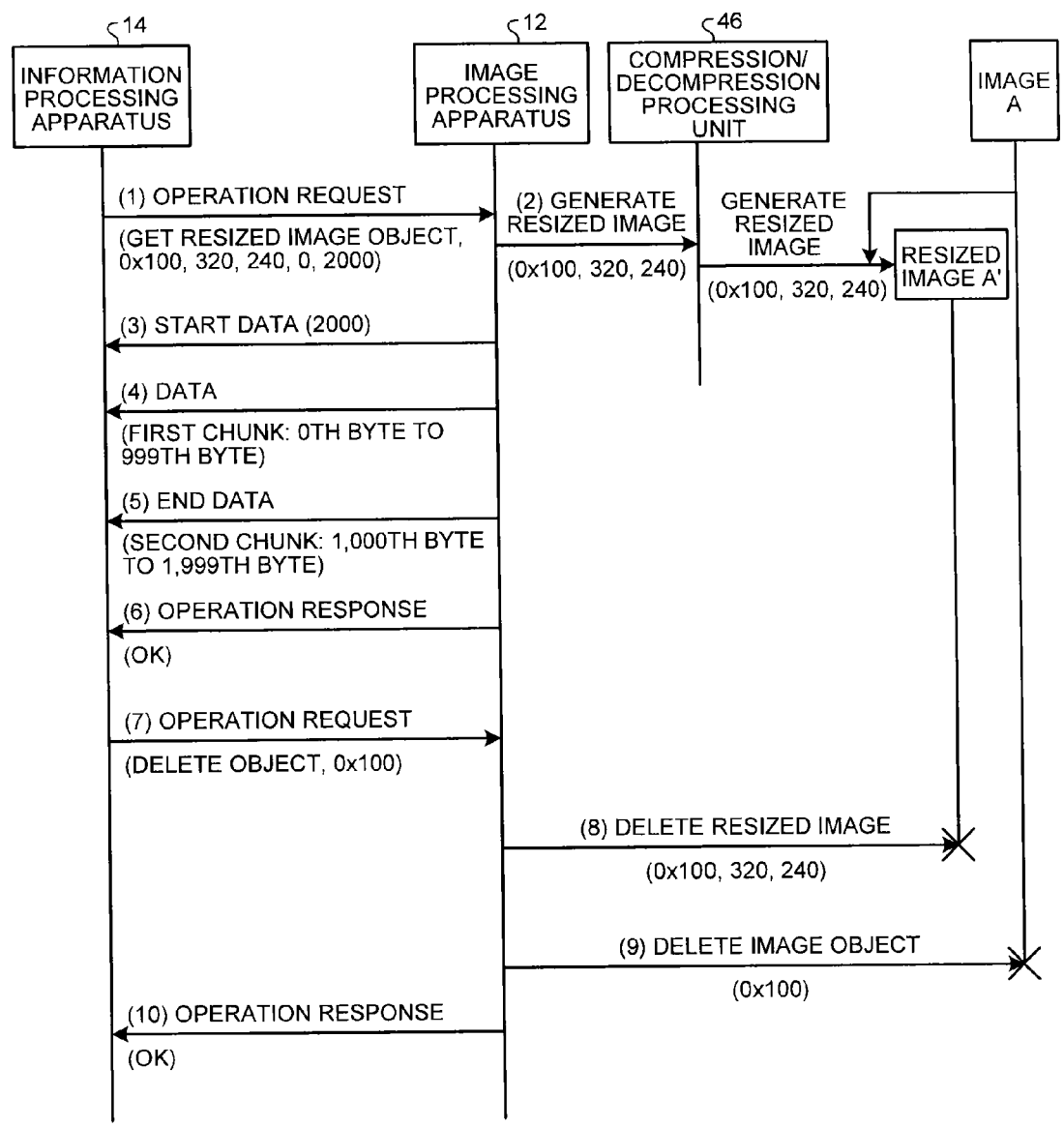
FIG. 11 is a sequence diagram of a scenario where the resized image is deleted using DeleteObject before receipt of a transfer completion notification about the resized image using the GetResizedImageObject operation according to the embodiment.

FIG. 11 is a sequence diagram of a scenario where a resized image is deleted using DeleteObject before receipt of a transfer completion notification about the resized image using the GetResizedImageObject operation according to the embodiment. In FIG. 11, it is assumed that data is transferred in units of 2,000 bytes using the GetResizedImageObject operation.

Steps (1) to (6) are similar to those of FIG. 7.

At Step (7), the transmitting unit 840 issues a request for DeleteObject to the image processing apparatus 12 using Operation Request Packet. DeleteObject is a command requesting that the image be deleted.

At Step (8), the deleting unit 894 deletes the temporarily-stored resized image A' because the resized image A' is associated with the image A.

At Step (9), the deleting unit 894 deletes the image A.

At Step (10), the transfer unit 892 transmits a notice of operation completion to the information processing apparatus 14 using Operation Response Packet.

Deleting an original image, from which a resized image is obtained, when the resized image is deleted in this manner allows the image processing apparatus 12 to increase free space in the file system 90D or a memory without receipt of a transfer completion notification.

Figure 12:
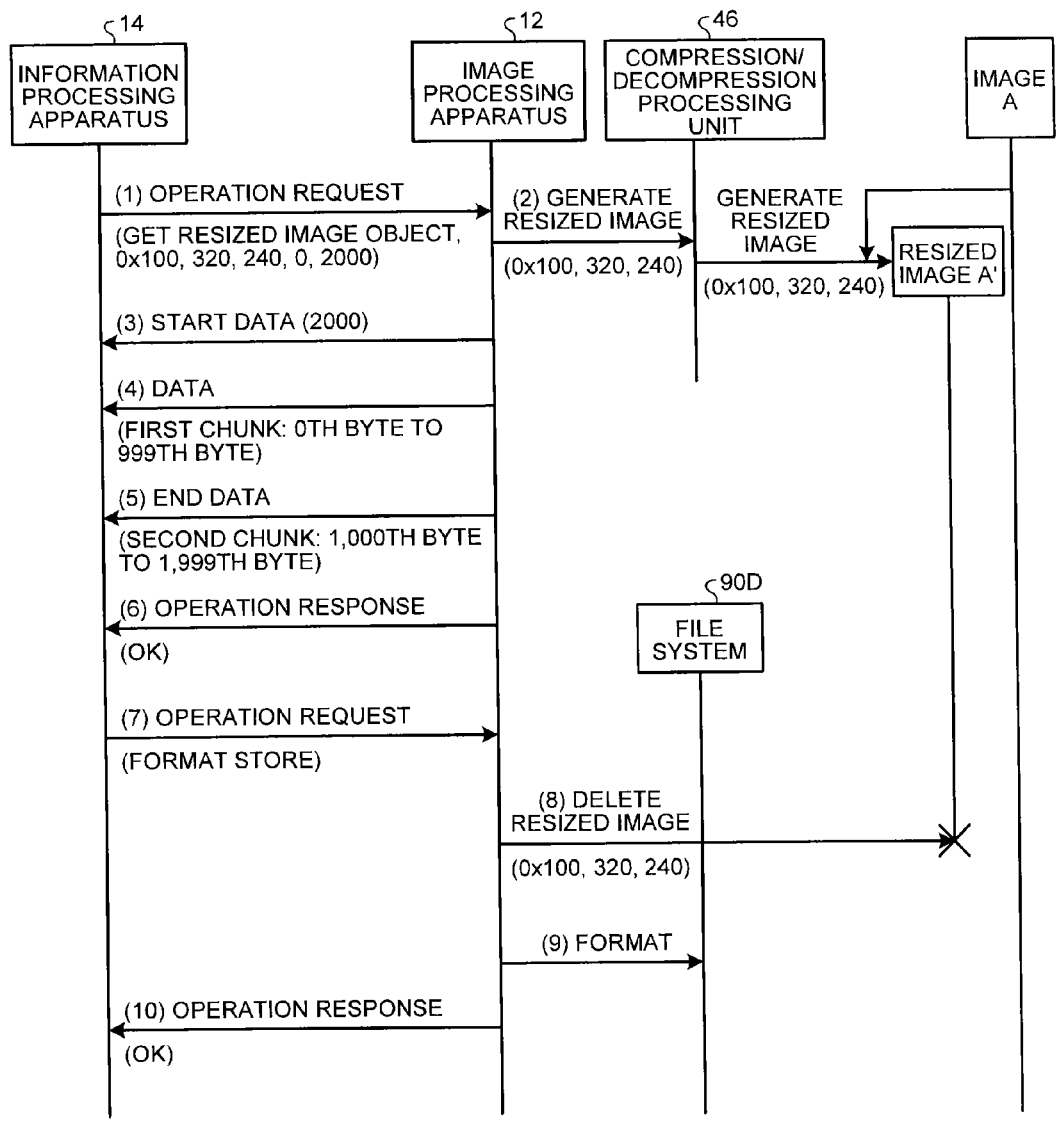
FIG. 12 is a sequence diagram of a scenario where an image object of the resized image is formatted using FormatStore before receipt of a transfer completion notification about the resized image using the GetResizedImageObject operation according to the embodiment.

FIG. 12 is a sequence diagram of a scenario where an image object of a resized image is formatted using FormatStore before receipt of a transfer completion notification about the resized image using the GetResizedImageObject operation according to the embodiment. In FIG. 12, it is assumed that data is transferred in units of 2,000 bytes using the GetResizedImageObject operation.

Steps (1) to (6) are similar to those of FIG. 7.

At Step (7), the transmitting unit 840 issues a request for FormatStore to the image processing apparatus 12 using Operation Request Packet. FormatStore is a command requesting that the file system 90D be formatted.

At Step (8), the deleting unit 894 deletes the temporarily-stored resized image A' because the resized image A' is associated with the image A stored in the file system 90D.

At Step (9), the file system 90D where the image A is stored is formatted.

At Step (10), the transfer unit 892 transmits a notice of operation completion to the information processing apparatus 14 using Operation Response Packet.

Deleting a temporarily-stored resized image when the file system 90D where an original image, from which the resized image is obtained, is stored is to be formatted in this manner allows the image processing apparatus 12 to increase free space in the file system 90D or a memory without receipt of a transfer completion notification.

Figure 13:
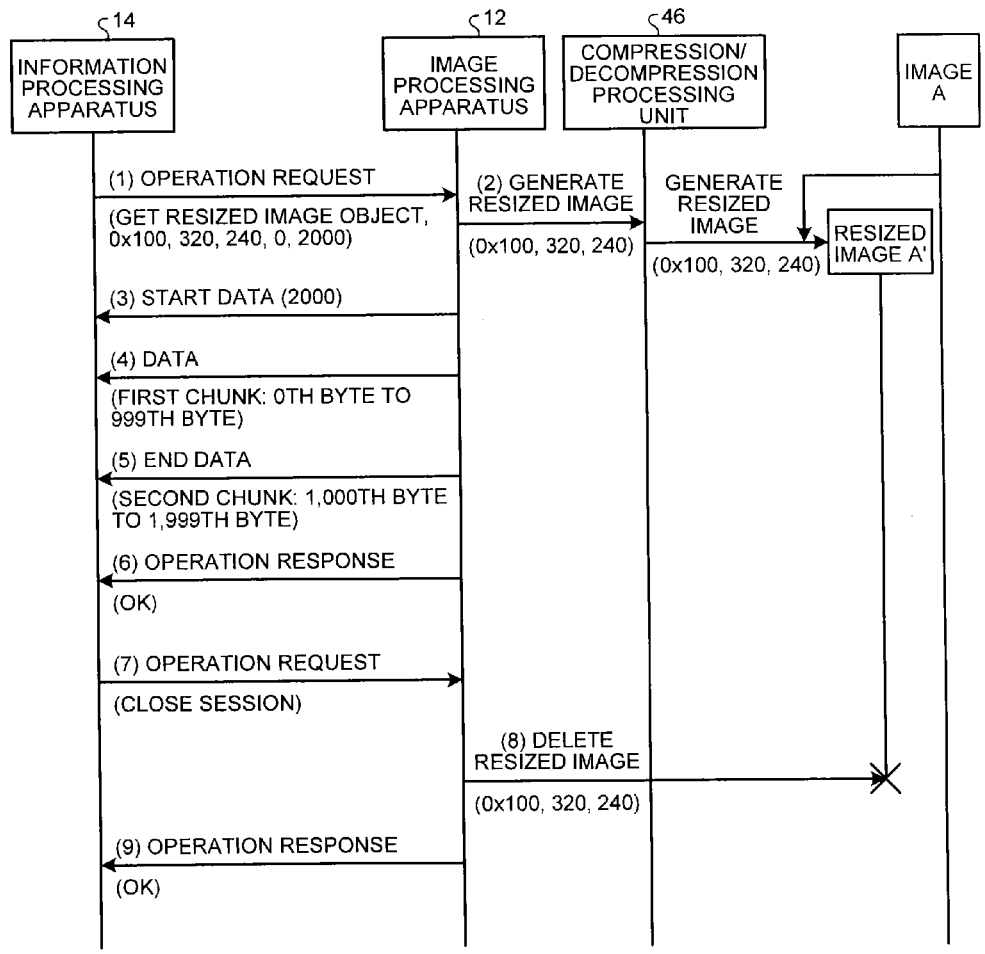
FIG. 13 is a sequence diagram of a scenario where a PTP session is closed before receipt of a transfer completion notification about the resized image using the GetResizedImageObject operation according to the embodiment.

FIG. 13 is a sequence diagram of a scenario where a PTP session is closed before receipt of a transfer completion notification about a resized image using the GetResizedImageObject operation according to the embodiment. In FIG. 13, it is assumed that data is transferred in units of 2,000 bytes using the GetResizedImageObject operation.

Steps (1) to (6) are similar to those of FIG. 7.

At Step (7), the transmitting unit 840 issues a request for CloseSession to the image processing apparatus 12 using Operation Request Packet. CloseSession is a command requesting that a PTP session between the information processing apparatus 14 and the image processing apparatus 12 be closed.

At Step (8), the deleting unit 894 deletes the temporarily-stored resized image A'.

At Step (9), the PTP responder library 89A closes the PTP session; the transfer unit 892 transmits a notice of operation completion to the information processing apparatus 14 using Operation Response Packet.

Deleting a temporarily-stored resized image when a session is closed in this manner allows the image processing apparatus 12 to increase free space in the file system 90D or a memory without receipt of a transfer completion notification.

As in the above-described case of CloseSession, a temporarily-stored resized image may be deleted before ResetDevice which resets the image processing apparatus 12, PowerDown which causes the image processing apparatus 12 to power down, or SelfTest which causes the image processing apparatus 12 to initiate a device-dependent self-test is performed.

FIG. 14 is a sequence diagram of a scenario where communication is closed before receipt of a transfer completion notification about a resized image, and transfer of the resized image is resumed at resumption of the communication using the GetResizedImageObject operation according to the embodiment. In FIG. 14, it is assumed that data is transferred in units of 2,000 bytes using the GetResizedImageObject operation.

Steps (1) to (4) are similar to those of FIG. 7.

At Step (5), the transmitting unit 840 requests to close TCP/IP communication.

At Step (6), the deleting unit 894 deletes the temporarily-stored resized image A'.

At Step (7), the PTP initiator library 84A and the PTP responder library 89A re-establish TCP/IP communication.

At Step (8), the transmitting unit 840 issues a request for GetResizedImageObject to the image processing apparatus 12 using Operation Request Packet to resume the transfer of the resized image A'. In this request, the value of Parameter4 is set to 1,000, and the value of Parameter5 is set to 2,000.

At Step (9), the compression/decompression processing unit 46 generates the resized image A' from the image A and temporarily stores the resized image A' in a memory or the file system 90D.

At Step (10), the transfer unit 892 transmits a notification that data of 1,500 bytes is to be transmitted to the information processing apparatus 14 using Start Data Packet.

At Step (11), the transfer unit 892 transmits the second chunk (1,000 bytes: the 1,000th byte to the 1,999th byte) of the resized image A' to the information processing apparatus 14 using Data Packet.

At Step (12), the transfer unit 892 transmits the third chunk (500 bytes: the 2,000th byte to the 2,499th byte) of the resized image A' to the information processing apparatus 14 using End Data Packet.

At Step (13), the transfer unit 892 transmits a notice of a notice of operation completion to the information processing apparatus 14 using Operation Response Packet.

At Step (14), the transmitting unit 840 issues a request for GetResizedImageObject to the image processing apparatus 12 using Operation Request Packet. In this request, the value of Parameter4 is set to 0xFFFF_FFFF, and the value of Parameter5 is set to 0.

At Step (15), the deleting unit 894 deletes the temporarily-stored resized image A'.

At Step (16), the transfer unit 892 transmits a notification that data of 0 bytes is to be transmitted to the information processing apparatus 14 using Start Data Packet.

At Step (17), the transfer unit 892 transmits a chunk of 0 bytes to the information processing apparatus 14 using End Data Packet.

At Step (18), the transfer unit 892 transmits a notice of operation completion to the information processing apparatus 14 using Operation Response Packet.

Deleting a temporarily-stored resized image when TCP/IP communication is closed in this manner allows the image processing apparatus 12 to increase free space in the file system 90D or a memory without receipt of a transfer completion notification.

The extended GetResizedImageObject operation of the embodiment allows requesting transfer with designation of a transfer starting point of the resized image A' in this manner. Accordingly, transfer of the resized image A' can be resumed without re-receiving already-received data.

As described above, according to the embodiment, in a case where it is desired to re-transfer image data after a failure in transfer of the image data or in a case where it is desired to resume transfer of image data after the transfer is interrupted due to a system reason, the transfer of the image data can be resumed without re-receiving an already-received part of the image data.

Furthermore, the embodiment allows, in a case where there is a limit in free space in memory of an image-data receiving side or in a case where image data resized to a desired pixel size is considerably large in data size, transferring only a part of the image data.

Each of the image processing apparatus 12 and the information processing apparatus 14 includes a control device such as a CPU, a storage device such as a ROM and a RAM, an external storage device such as a hard disk drive or a compact disc (CD) drive, a display device, and an input device. Thus, each of the image processing apparatus 12 and the information processing apparatus 14 has a typical-computer-based hardware configuration.

The program instructions to be executed by the image processing apparatus 12 and the information processing apparatus 14 to perform the above-described operation may be provided as being recorded in a non-transitory tangible computer-readable recording medium, such as a compact disc read only memory (CD-ROM), a flexible disk (FD), a compact disc recordable (CD-R), or a digital versatile disc (DVD), as an installable or executable file.

The program instructions to be executed by the image processing apparatus 12 and the information processing apparatus 14 to perform the above-described operation may be configured to be stored in a computer connected to a network such as the Internet and provided by being downloaded over the network. The program instructions to be executed by the image processing apparatus 12 and the information processing apparatus 14 to perform the above-described operation may be configured to be provided or distributed over a network such as the Internet. The program instructions to be executed by the image processing apparatus 12 and the information processing apparatus 14 to perform the above-described operation may be configured to be provided as being stored in a ROM or the like in advance.

The program instructions to be executed by the image processing apparatus 12 and the information processing apparatus 14 to perform the above-described operation are configured in modules including the units described above. From the viewpoint of actual hardware, the CPU (processor) reads out the program instructions from the storage medium and executes the program instructions to load the units into a main storage device, thereby generating the units on the main storage device.

According to an aspect of the present invention, it is possible to transfer only a part of image data resized to a desired size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
processing circuitry configured to
receive a transfer request that is sent from an information processing apparatus using GetResizedImageObject of PTP (Picture Transfer Protocol), the transfer request containing an identifier for identification of an image object, a size of image data obtained by resizing the image object, a transfer starting point of the image data, and a transfer end point of the image data, wherein the transfer starting point and the transfer end point are specified using extension parameter fields of GetResizedImageObject;
generate the image data from the image object based on the transfer request by checking values in the extension parameter fields of GetResizedImageObject; and
transfer the generated image data from the transfer starting point to the transfer end point to the information processing apparatus based on the transfer request.

2. The image processing apparatus according to claim 1, wherein the processing circuitry is further configured to
receive a transfer completion notification from the information processing apparatus, the transfer completion notification containing the identifier, the size of the image data, and transfer completion information indicating that transfer of the image data is completed, and
delete the image data based on the transfer completion notification.

3. The image processing apparatus according to claim 2, wherein the processing circuitry is further configured to
receive a cancel request from the information processing apparatus, the cancel request requesting to cancel the transfer request,
cancel the transfer of the image data based on the cancel request, and
not delete the image data based on the cancel request.

4. The image processing apparatus according to claim 1, wherein the processing circuitry is further configured to
receive a deletion request containing the identifier from the information processing apparatus, the deletion request being specified by specific values in the extension parameter fields of GetResizedImageObject, and
delete the image data and the image object based on the deletion request.

5. The image processing apparatus according to claim 1, wherein the processing circuitry is further configured to
receive a predetermined request from the information processing apparatus, and
delete the image data based on the predetermined request.

6. The image processing apparatus according to claim 1, wherein the processing circuitry is configured to perform communication with the information processing apparatus using picture transfer protocol (PTP).

7. The image processing apparatus according to claim 1, wherein
the identifier and the size of the image data are specified with a parameter in which usage of the GetResizedImageObject is defined in advance.

8. The image processing apparatus according to claim 1, wherein
the processing apparatus is configured to receive, from the information processing apparatus, a cancel request requesting to cancel the transfer request, and suspend transmission of the image data based on the cancel request, and
when the transmission of the image data is suspended, and a predetermined process in the image processing apparatus is completed, the processing circuitry receives a transfer request requesting to transmit a continuously remaining portion of the image data that is a portion of the image data remaining as untransmitted when the transmission of the image data is suspended based on the cancel request.

9. An information processing apparatus, comprising:
processing circuitry configured to
transmit a transfer request to an image processing apparatus using GetResizedImageObject of PTP (Picture Transfer Protocol), the transfer request containing an identifier for identification of an image object, a size of image data obtained by resizing the image object, a transfer starting point of the image data, and a transfer end point of the image data, wherein the transfer starting point and the transfer end point are specified using extension parameter fields of GetResizedImageObject; and
receive the image data from the transfer starting point to the transfer end point from the image processing apparatus based on the transfer request.

10. An image transfer method comprising:
receiving a transfer request that is sent from an information processing apparatus using GetResizedImageObject of PTP (Picture Transfer Protocol), the transfer request containing an identifier for identification of an image object, a size of image data obtained by resizing the image object, a transfer starting point of the image data, and a transfer end point of the image data, wherein the transfer starting point and the transfer end point are specified using extension parameter fields of GetResizedImageObject;

generating the image data from the image object based on the transfer request by checking values in the extension parameter fields of GetResizedImageObject; and transferring the generated image data from the transfer starting point to the transfer end point to the information processing apparatus based on the transfer request.

11. The image transfer method of claim 10, wherein the generating step comprises generating the image data by resizing the image object using the size included in the transfer request.

* * * * *